Dec. 3, 1940.　　　R. H. CARSON　　　2,223,551
HEATING APPARATUS
Filed Feb. 12, 1940　　　6 Sheets-Sheet 1

Inventor:
Robert H. Carson.
By: Harry H. Hitzeman Atty.

Patented Dec. 3, 1940

2,223,551

UNITED STATES PATENT OFFICE 2,223,551

HEATING APPARATUS

Robert H. Carson, Niagara Falls, N. Y., assignor to American Utensil Company, a corporation of Illinois Application February 12, 1940, Serial No. 318,567

15 Claims. (Cl. 257—2)

My invention relates to improvements in cooking or heating apparatus and like devices.

My invention relates to a novel process for heating or cooking tomatoes or other vegetables and fruit, or other food products for canning purposes.

The principal object of my invention is to provide improved means for heating or cooking tomatoes or other products in a liquid state, without subjecting them to live steam or other direct heating mediums and while the product is passing through the machine in a continuous process.

A further object of the invention is to provide a novel continuous process of cooking or heating food products while they are passing through the machine.

A further object is to provide means associated with the heating medium and with the product being prepared to automatically shut off the heating medium when a certain temperature is reached.

A further object is to provide a novel construction whereby the flow of the product through the heating tank will be in a direction opposite to the flow of a liquid heating medium.

A further object of the invention is to provide an improved heating tank within which the product is circulated.

A further object is to provide as a heating means a combination of steam and hot water with steam jets disposed in the water for directly increasing and maintaining the temperature of the same and also for circulating the same.

A further object is to provide auxiliary combined pressure and reservoir tanks on the sides of the heating tank for assisting in heating the water in the heater tank, keeping its level about the product conduits and quickly reducing the same whenever quick cooling of the product is desired.

A further object of the present invention is to provide an improved heating apparatus of the class described wherein the temperature at which the material is heated or cooked is automatically maintained.

A further object of the present invention is to provide a compact heater apparatus of the type specified wherein a plurality of parallel conduits are utilized to convey the material to be cooked back and forth while the same is being heated.

A further object of the present invention is to provide an improved construction of heating tank whereby the parallel material conduits are connected at the ends of the tank through removable door members easily removed for cleaning or repair or for cleaning or repair of the material conduits.

A further object of the present invention is to provide an improved automatic control valve mechanism capable of being actuated to shut off the supply of steam at a certain temperature of the heating medium, at a certain temperature of the heated product or whenever the continuous flow of the material through its conduit has ceased.

A further object of the invention is to provide an auxiliary preliminary heater member for giving the food products an initial heating action prior to its introduction into the heating tank.

A further object of the invention is to furnish a heating medium to the auxiliary heater member only when the heating tank is operating and means associated therewith to stop the flow of the heating medium to the auxiliary heater as soon as heating action ceases in the heating tank.

A further object of the invention is to provide a novel arrangement of steam nozzles in the heater tank capable of causing a regulated and continuous circulation of the heating medium in the heating tank.

Other objects and advantages will be more apparent from the following description wherein reference is had to the accompanying six sheets of drawings upon which

In the embodiment of the invention which I have chosen to illustrate, I have shown a generally rectangular, horizontally disposed heater tank 10 provided upon opposite sides with the auxiliary pressure tanks 12 and 14. A suitable supporting structure may comprise the upright members 16 and angle members 18 supporting the tank 10 adjacent the lower end thereof.

Figure 1:
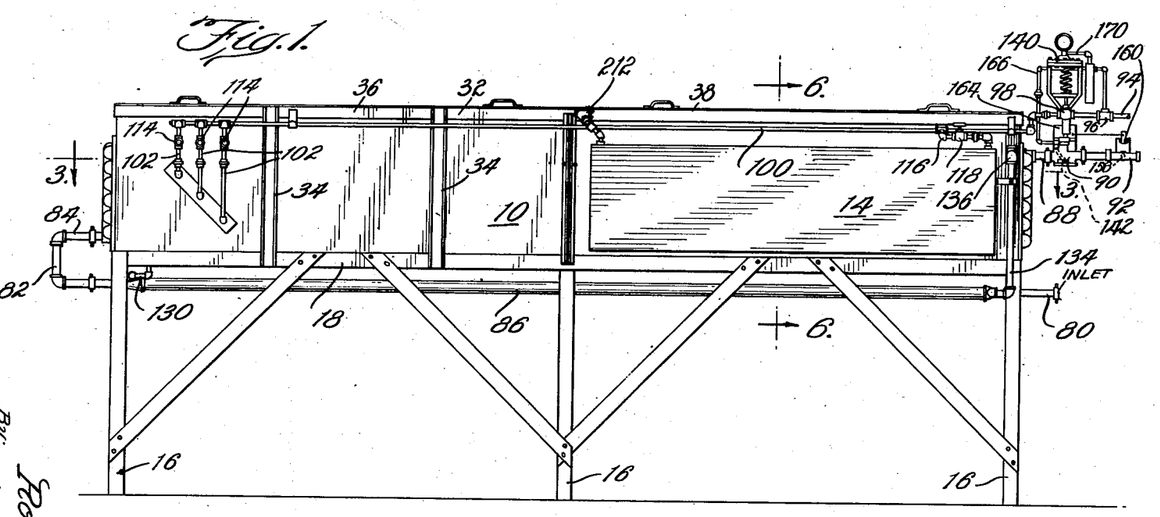
Fig. 1 is a side elevational view of my improved heating apparatus.
Figure 3:
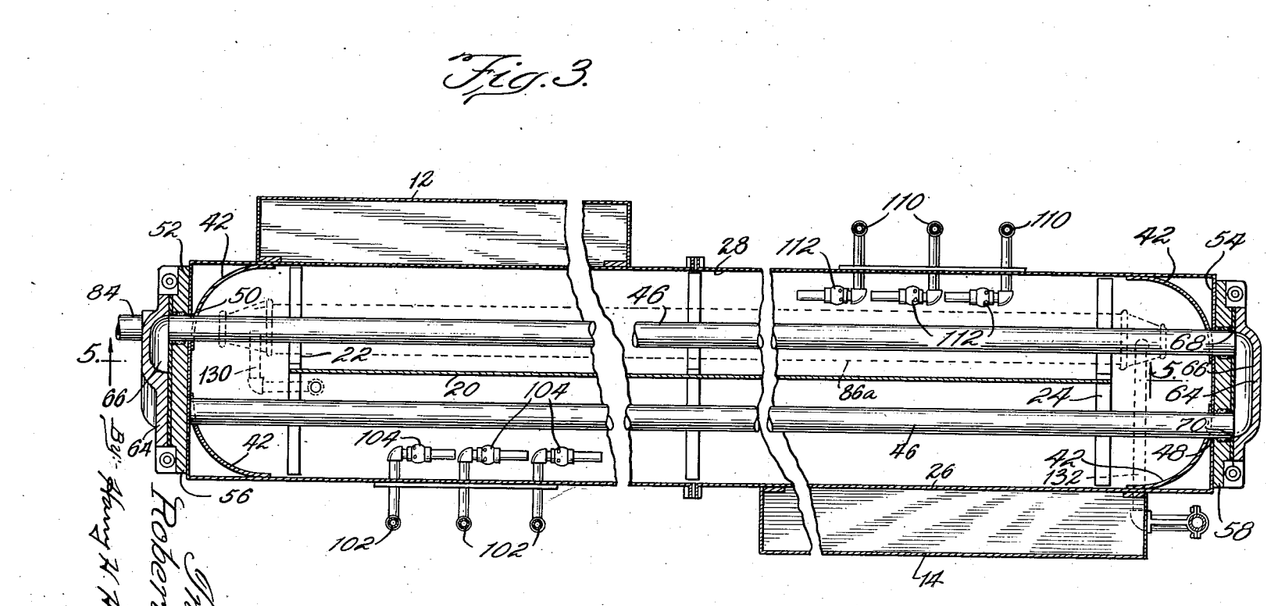
Fig. 3 is a plan sectional view with parts broken away to shorten the length of the view and is taken generally on the line 3—3 of Fig. 1.
Figure 4:
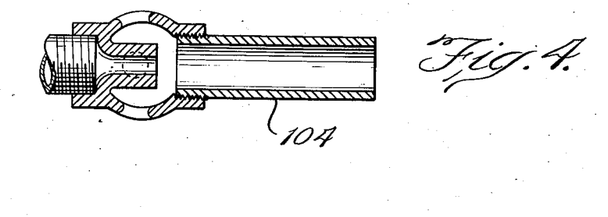
Fig. 4 is a cross-sectional view of one of the steam discharge nozzles employed.
Figure 5:
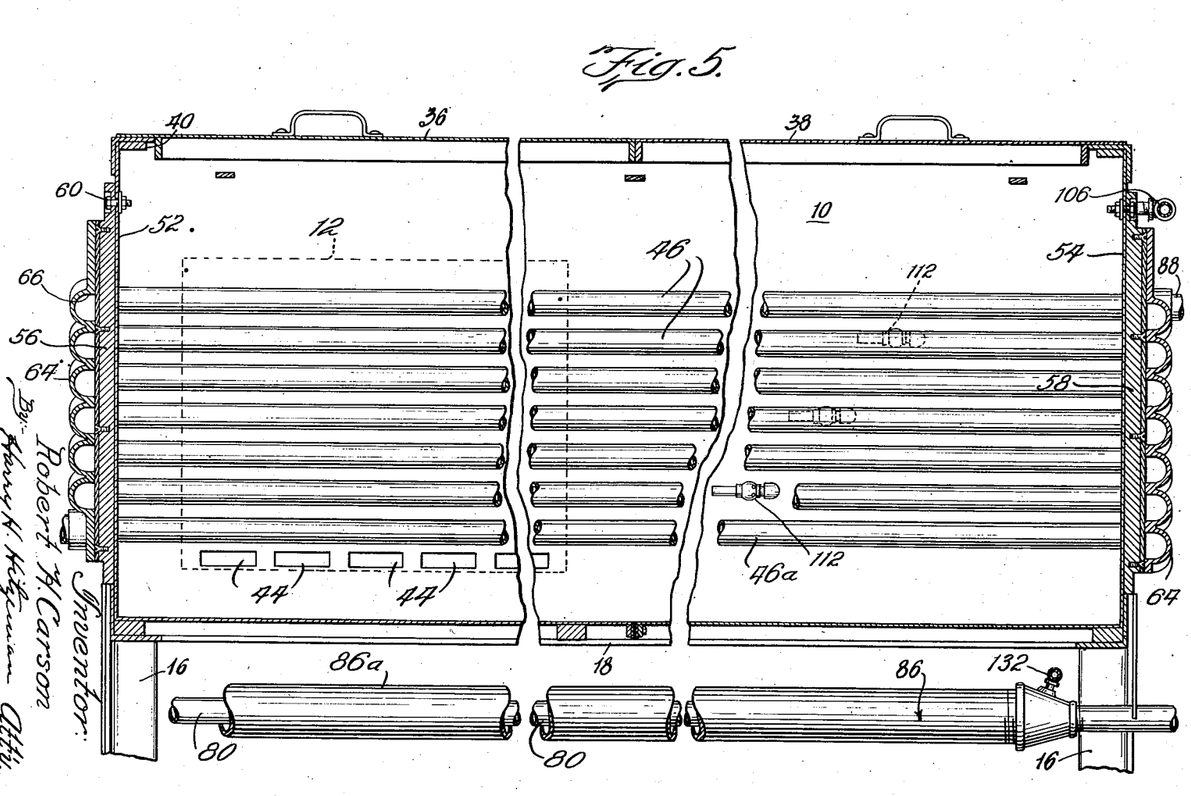
Fig. 5 is a longitudinal sectional view with parts broken away to foreshorten the view and is taken generally on the line 5—5 of Fig. 3.
Figure 6:
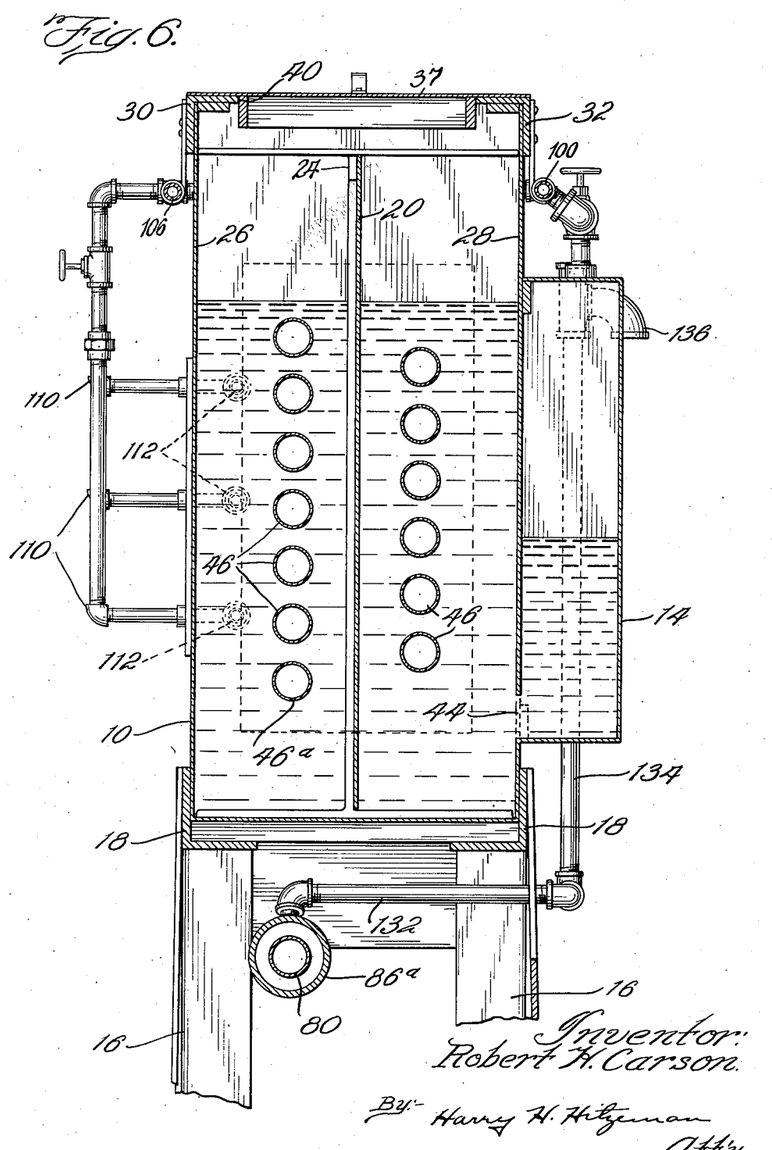
Fig. 6 is a vertical sectional view through a portion of the heating tank and associated parts and is taken generally on the line 6—6 of Fig. 1.

The tank 10, preferably formed of sheet metal, may be provided (as shown in Fig. 3) with a partition or wall member 20 medially disposed therein and extending generally the length thereof. It is supported adjacent its opposite ends by suitable strap members 22 and 24 connected between the parallel vertical walls 26 and 28 of the tank 10. Suitable angle members 30 and 32 (see Fig. 6) extend about the top of the tank 10 to reinforce the same and are connected by vertical braces 34 (see Fig. 1) with the angle members 18. I provide a pair of cover members 36 and 38 to close the upper opening 40 in the tank. Access for pouring in water or for cleaning out the tank is thus obtained through the open top 40. While the tank is generally rectangular in shape as shown in Fig. 3, I provide vertical upright wall corner portions 42 in all four of the corners. It will be noted that these are arcuate in shape and provide a generally rounded end or corner in each end corner of the tank.

The auxiliary water tanks 12 and 14 previously mentioned, may be generally rectangular in shape and be secured by welding or any other suitable manner to the vertical walls 26 and 28 of the tank 10. Access from the tanks 12 and 14 is permitted by a plurality of rectangular openings 44 adjacent the lower ends of the tanks 12 and 14 and slightly above the bottom of the tank 10.

I provide a plurality of parallel horizontally disposed material conduits 46 positioned within the tank 10 and extending the length thereof upon opposite sides of the medial dividing wall 20. The conduits 46 may extend through suitable openings 48 and 50 in the end walls 52 and 54 of the tank 10 and be fixedly mounted in the end plates 56 and 58 attached to the end walls 52 and 54 of the tank. The end plates 56 and 58 may be securely attached to the end walls of the tank by suitable bolt members 60 attached about the periphery of the same and provided upon the inside of the tank with suitable gaskets to prevent leakage at the points of connection.

Figures 7, 9:
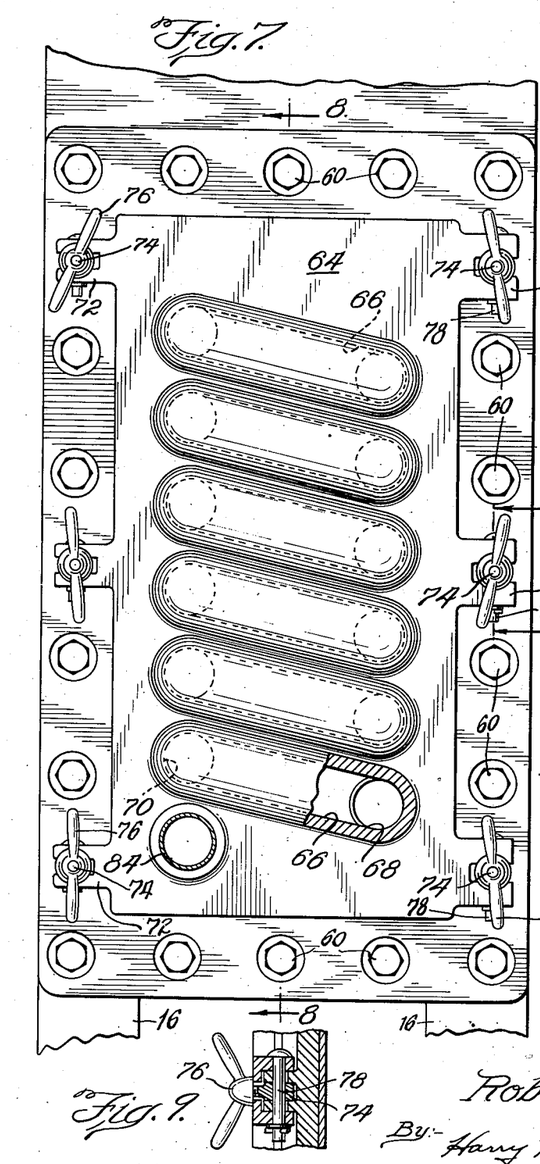
Fig. 7 is a fragmentary end elevational view of the tank showing the end plates used to provide the connection between the parallel material conduits.
Fig. 9 is a fragmentary sectional view of one of the cover plate hinges taken generally on the line 9—9 of Fig. 7.
Figure 8:
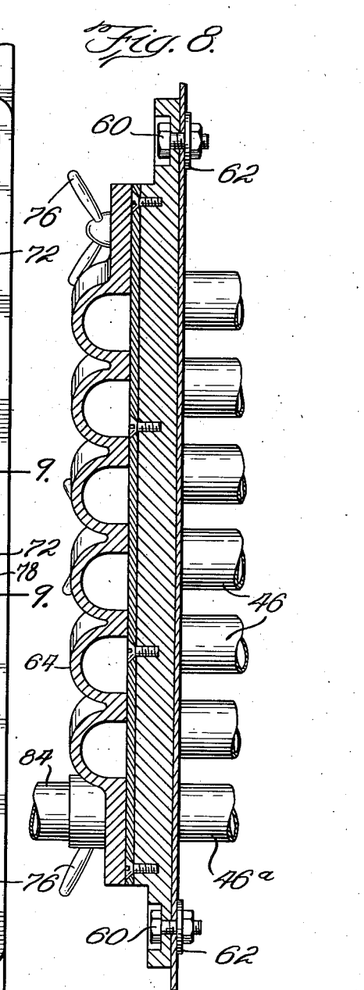
Fig. 8 is a vertical sectional view thereof taken generally on the line 8—8 of Fig. 7.

In order to effect communication between the ends of the conduits 46 and to provide a continuous unobstructed circuitous path through the superimposed conduits 46, I provide a cover plate 64 formed with a plurality of passageways 66 therein. The passageways are disposed at an angle as shown in Fig. 7 and so arranged that the opening 68 of the lower end of a passageway may communicate with an opening 70 thereabove and directly in line with the next highest material conduit 46. The cover plates 64 are provided with a plurality of side locks 72 through which fastening bolts 74 extend so that by fastening down the wing nuts 76 on the bolts 74 the cover is effectively held in position. The cover is also adapted to be hingedly mounted on its right side on the hinge bolts 78 that extend through the fastening bolts 74 and thus at desired times permit the end plate to be swung to the right to permit access to the conduits 46 for cleaning or replacement.

The circulating system of the material to be heated will next be described. Tomato juice or other material that it is desired to heat or cook may be pumped or otherwise forced under pressure to the horizontally disposed conduit 80 which extends below the tank 10 from the right end thereof to the left end of the machine and then upwardly through conduits 82 and 84 into the lowermost heating conduit 46a. It will be noted that the conduit 80 is enclosed throughout the greater portion of its length in an auxiliary heater pipe 86, later to be described. The pipe 84 which communicates with conduit 46a, thus permits material to enter the heating tank 10 within the conduits described and is circulated back and forth through pipes 46 and the end covers, eventually passing out of pipe 88 through a valve member 90 and pipe 92 to a desired destination.

The heating medium which in the present instance is a combination of steam and hot water, will now be described. Steam is obtained from a suitable source through the conduit 94 and may pass through the T-member 96, valve 98 and the longitudinal conduit 100 which extends generally the length of the tank 10 adjacent the upper side thereof, and communicates through suitable vertically disposed pipes 102 with the steam discharge nozzles 104 positioned within the tank 10 at various angularly arranged positions. A similar pipe 106 may extend from the T-member 108 to suitable vertically disposed pipes 110 that communicate with similar steam discharge nozzles 112 located similarly upon the opposite side and in the right end of the tank 10. Suitable hand valves 114 are provided for each one of the pipe lines 102 and 110. I provide a pipe line 116 extending from the pipe 100 to the upper end of the auxiliary tank 14 and a suitable valve 118 for controlling the admission of steam thereto. I provide a similar steam conduit 120 extending from the pipe line 106 to the upper end of auxiliary tank 12 and provide a suitable valve member 122 to control the admission of steam to the same. In the usual operation of my improved heater or cooker the tank 10 and the auxiliary tanks 12 and 14 normally receive a supply of water. As the steam is permitted to enter the tank 10 through the nozzles 104 and 112, it is directed under pressure along the sides of the tank 10 with the result that the water is immediately heated and a circulation of the water in the direction of the flow of steam is immediately set up around the medial dividing wall 20. The steam that is applied to the top of the water in the tops of the auxiliary tanks 12 and 14 is for the purpose of providing a pressure on the same so that it is possible to at all times keep the level of the water in the tank 10 above the uppermost of the material conduits 46. This is accomplished by reason of the fact that the water in the tanks 12 and 14 is forced down through the openings 44 and through the tank 10. It will thus be seen that in its normal operation, due to the admission of steam, as explained, through the nozzles, so directed that they set up a circulation, that there is a continuous and rapid circulation of heated water in the tank. Due to the manner in which the material conduit 80 and the conduits 46 are arranged, it is seen that the flow of the material is in a direction opposite to the flow of the heating medium, thus greatly increasing the efficiency of the heating medium in that there are no dead pockets in the tank where heated water will not be in continuous contact with the pipes in which the colder material is being circulated.

For heating the auxiliary heater 86, previously mentioned, and which is for the purpose of taking the initial chill from the material to be cooked, I provide a suitable conduit 130 extending from the tank 10 to the cylindrical member 86a which encloses the pipe 80. The outlet for the hot water which has been circulated around pipe 80, may include the horizontal pipe 132 and the upright pipe 134 provided with a suitable overflow 136 at a point generally level with the desired water level of the tank 10. The water in the preheater 86 will thus be kept hot and in circulation because, due to the continuous injecting of steam, there will be a normal, steady flow of excess water through the overflow 136.

Automatic means are provided in connection with the supply of steam for preventing the scorching or burning of material to be cooked. These means include thermostatic controls associated with the hot water in the tank 10 and similar thermostatic means positioned in the conduit 46 so that if the temperature of either the heating medium or the product goes above a certain desired setting, an automatic valve 140 is immediately operated to close off the supply of steam.

In connection with the automatic control, it is also desirous to have means for controlling the supply of steam in accordance with the supply of the product to be cooked, and accordingly I have provided a means associated with the discharge pipe for the products that operates to close off the steam valve whenever the flow of the product has ceased. These means include a paddle or flap valve 142 located in the fitting 90 in the material discharge pipe.

The thermostatic means associated with the tank 10 may include the bulb 150 inserted through a side wall of the tank and provided with a gauge 152 and an electric conduit 154 leading to the switch box 156.

Figure 2:
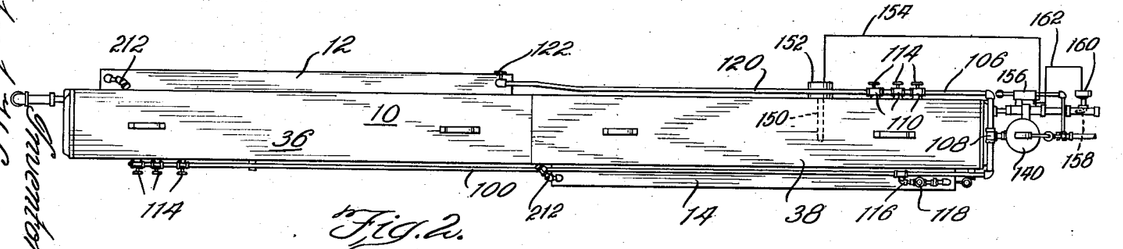
Fig. 2 is a plan view thereof.

The thermostatic means associated with the material conduit 46 may be a similar bulb 158 associated with the gauge 160 and inserted in the material conduit in the outlet section 92. A similar electric conduit 162 extends to the switch box 156 (see Figs. 1 and 2).

The automatic control box 164 may be conveniently located adjacent the steam inlet conduit 94 and shut-off valve 140. A steam pipe 166 may extend from the T 96 to the fitting 168 in the control box. A by-pass pipe 170 may extend from this pipe to the top of the diaphragm of the automatic valve 140. This permits the steam pressure in the line to bear on the diaphragm of the valve 140 and hold the valve open against the coiled spring of the valve. Since this type of automatic valve is well known in the art, it is felt that further description is unnecessary.

Figures 10, 11, 12:
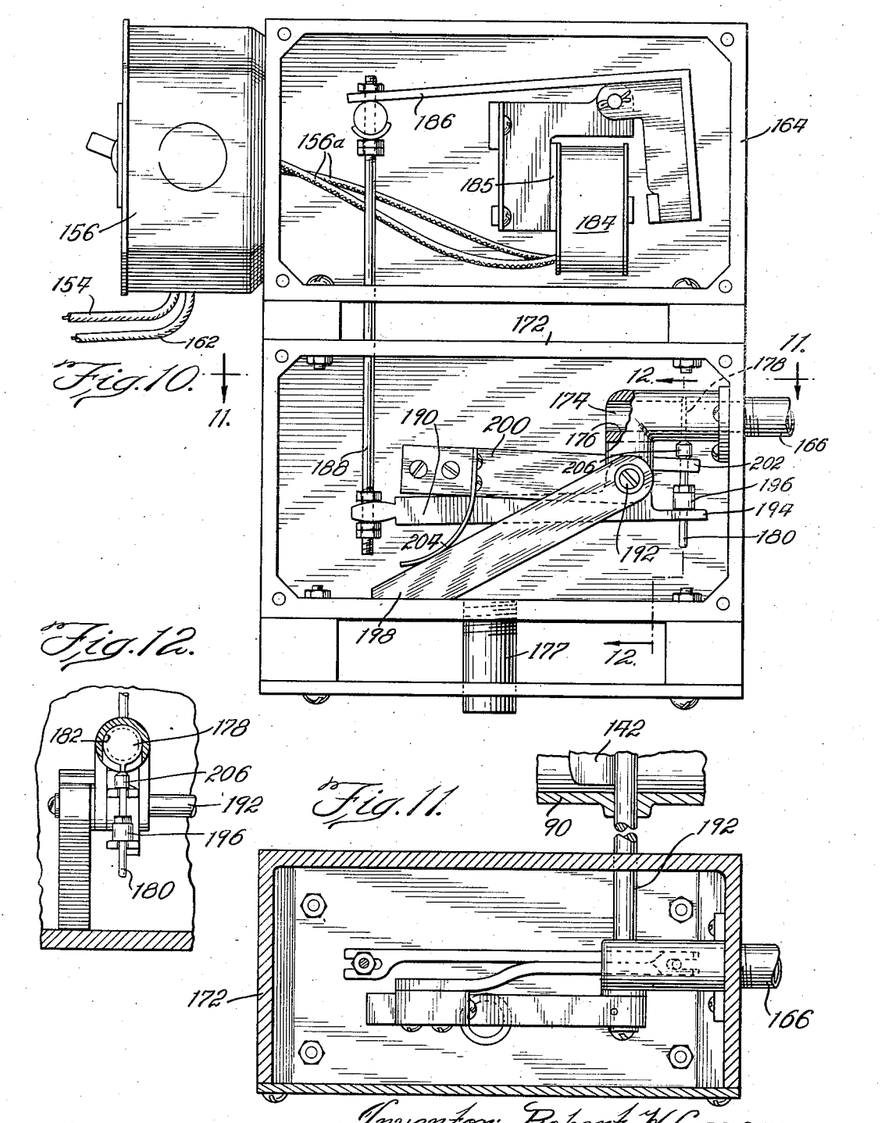
Fig. 10 is an elevational view of my improved steam supply control mechanism box showing the parts therein and the cover removed.
Fig. 11 is a plan sectional view thereof taken generally on the lines 11—11 of Fig. 10.
Fig. 12 is a vertical sectional view of the valve control parts taken generally on the line 12—12 of Fig. 10.

It will be noted, (see Figs. 10 to 12), that the conduit 166 enters the control box 172 and communicates with an elbow-shaped bracket 174. This bracket has a passageway 176 therein which is normally open and thus it permits steam to pass through the passageway 166 and spill out in the box 172 from which it may pass by means of the downwardly disposed pipe 177.

In order to control the action of the valve 140, it is necessary to close off the pipe 166 to permit the steam pressure to build up over the diaphragm. For this reason I have provided a shutter member 178 connected to a downwardly disposed rod 180. The shutter member is mounted in a groove 182 in the fixture 174 and is normally in a down or open position, permitting the steam to pass outwardly through pipe 166. In the event, however, that the temperature of the material flowing through the conduit 92 becomes hotter than for example 191°, the thermostatic control member 158, mounted in this conduit, operates to energize the solenoid 184, thereby pulling the arm 186 downwardly. This arm carries a vertically disposed arm 188 which is operatively connected to a lever 190 that is pivoted upon rod 192. Thus, when the magnet 185 is attracted by the solenoid 184, as when the switch is closed by one of the thermostatic elements 158 or 150, the lever 190 will be swung about its pivot 192 and the end 194 will move upwardly against an abutment 196 on the rod 180, moving the closure member 178 into position in the member 174 and thus effectively shut off the escape of steam through the conduit 166. This results in a building up of the pressure through the pipe 170 above the diaphragm in the valve 140, and as soon as the tension of the spring is overcome, the valve is shut and prevents further introduction of steam.

The temperature of the water in the tank 10 is regulated in a similar manner by the thermostatic element 150 which connects through the conduit 154 with the switch box and from there through the wires 156a with the solenoid 184.

As previously mentioned, the flap valve 142 in the juice outlet conduit is normally held up by the flow of material in the material discharge pipe. However, as soon as the steam is shut off by the action of either thermostat, it will be apparent that the rod 192 in turning moves the flap valve 142 down to close off the flow of material.

It is desirable to close off the steam supply whenever the flow of material through the discharge pipe 90 ceases. Accordingly, whenever the flow ceases, the flap valve 142 drops by gravity, turning the pivot 192 and permitting the arm 198, attached to the pivot, to rest against the floor of the control box 172.

I mount an arm 200, having the forked extension 202, upon the rod 192. The arm 200 carries a spring member 204 which normally holds the arm 198 against the floor of the control box and the flap valve shut. Thus, in closed position, the forked portion 202 of the arm bears against an abutment 206 on the rod 180 and normally holds the closure member 178 in position in the fixture 174.

From the foregoing description it will be apparent to those skilled in the art that I have provided three separate elements for closing off the supply of steam whenever the heating medium becomes too hot and the product is in danger of being scorched. Thus, the temperature of the steam and water mixture is absolutely controlled as well as the temperature of the material being cooked. The thermostatic elements which I employ are so devised that the switch will operate the closure member 178 to an open position when the temperature drops to about 189° and will operate the switch to close this member when the temperature goes above 191°. It will further be noted that even though the temperature of both the water and the product is less than 189°, if there is no flow of the material, the steam supply will still be shut off until such flow is started.

It will be obvious that the valve 140 may be dispensed with and a usual thermostatically controlled valve may be placed directly in the steam supply line with only one thermostatic element controlling the same. This element may be the element 150 located in the tank 10, or it may be the element 158 located in the juice outlet.

The importance of the auxiliary tanks 12 and 14 will now be pointed out. Whenever the heater is started and steam enters the tanks above the water therein, the steam pressure will force the water into the main tank where the same will mingle with the steam and water in the tank. In this manner the level of the heating medium in the tank is easily and quickly raised to a point above the highest material conduit. Likewise, when the steam is shut off the steam in the auxiliary tanks is permitted to escape through the check valves 212 located in the upper walls of the auxiliary tanks and adapted to permit a gradual discharge when the pressure has been decreased. These valves operate, therefore, only when the steam is shut off and permit the steam in the tanks to be slowly discharged, thus permitting the water in the main tank to flow into the auxiliary tanks and materially decrease the level of the water in the main tank. Since the uppermost material conduits in the tank are always the hottest, this will materially aid in quick cooling of these conduits.

The supply of hot water to the pre-heating pipe 86, as previously explained, is from the bottom of tank 10. The overflow from the preheater permits the water which enters the preheater to gradually seep out as more water is provided in the main tank by virtue of the condensation of the steam. Thus, a continuous supply of comparatively hot water is being provided for the auxiliary heater whenever the machine is in operation.

While I have illustrated and described a specific embodiment of the invention, it will be apparent to those skilled in the art that changes and modifications may be made in the exact details shown, and I do not wish to be limited in any particular. Rather, what I desire to secure and protect by Letters Patent of the United States is:

1. Apparatus of the class described including a comparatively long horizontally disposed tank, a medial vertical dividing wall therein extending almost to the ends of said tank, a plurality of material conduits disposed in said tank on both sides of said medial wall, said conduits connected beyond the ends of said wall and so arranged that the material may circulate in said conduits about the wall, liquid means in said tank circulated in a direction opposite to the flow of the material, steam jets mounted in the sides of said tank below the level of said liquid and steam under pressure directed into said liquid for heating the same and causing it to circulate.

2. Apparatus of the class described including a comparatively long horizontally disposed tank having a liquid medium therein, said tank having vertical side and end walls, a vertical medial dividing wall therein extending almost to the end walls of said tank, a plurality of material conduits disposed in said tank on both sides of said medial wall, said conduits connected by passageways in said end walls and so arranged that the material may circulate therein about the medial wall, said liquid means in said tank circulated in a direction opposite to the flow of the material in said conduits, steam jets mounted in the sides of said tank below the level of said liquid and steam under pressure directed into said liquid through said nozzles for heating the same and causing it to circulate.

3. In apparatus of the class described the combination with a tank having liquid heating means therein, of a conduit for circulating material to be heated, said conduit adapted to be submerged in said liquid heating means, and automatic means controlling the supply of heating medium in accordance with the temperature of the heating medium, said means adapted to reduce the volume of liquid heating means to uncover a portion of said material conduit, said means including auxiliary tanks connected to said first named tank and adapted to receive a portion of the liquid therein whenever the temperature of either the heating medium or the material is excessive.

4. In apparatus of the class described, the combination of an elongated horizontally disposed tank having water therein, a vertical medial dividing wall therein extending almost to the ends of said tank, a plurality of parallel pipe members therein fastened in opposite ends of said tank, half of said pipe members on each side of said wall, covers on the ends of said tanks having passageways therein forming a continuous circuitous conduit between said pipe members, a supply pipe connected through one of said covers to the lowermost of said pipes, a discharge pipe connected through one of said covers to the uppermost of said pipes, a pair of auxiliary tanks upon opposite sides of said tank communicating therewith adjacent its lower end, water in said tanks, a source of steam under pressure, conduits from said source communicating with the upper end of each of said auxiliary tanks adapted to force the water therein into said first named tank to raise the level of the water in said tank, conduits from said source communicating with a plurality of nozzles in said tank, said nozzles arranged in groups and positioned parallel to opposite side walls of said tank, whereby when steam is discharged therefrom said water is heated and circulated.

5. In apparatus of the class described, the combination of an elongated horizontally disposed tank having water therein, a medial vertical dividing wall in said tank extending almost to the ends of the same, a plurality of parallel pipe members in said tank disposed on both sides of said medial wall and fastened in opposite ends of said tank, covers on the ends of said tanks having passageways therein forming a continuous circuitous conduit between said pipe members, a material supply pipe connected through one of said covers to the lowermost of said pipes, a material discharge pipe connected through one of said covers to the uppermost of said pipes, a pair of auxiliary tanks upon opposite sides of said tank communicating therewith adjacent its lower end, water in said tanks, a source of steam under pressure, conduits from said source communicating with the upper end of each of said auxiliary tanks the steam adapted to force water from said tank into said first mentioned tank, conduits from said source communicating with a plurality of nozzles in said tank the steam adapted to circulate and heat the water therein, said nozzles arranged in groups and positioned parallel to opposite side walls of said tanks and temperature control means in the water in said tank and in said material discharge pipe for controlling the supply of steam.

6. In apparatus of the class described, the combination of an elongated horizontally disposed tank having water therein, a plurality of horizontally disposed parallel pipe members in said tank and fastened in opposite ends of said tank, covers on the ends of said tanks having passageways therein forming a continuous circuitous conduit between said pipe members, a material supply pipe connected through one of said covers to the lowermost of said pipes, a material discharge pipe connected through one of said covers to the uppermost of said pipes, a pair of auxiliary tanks upon opposite sides of said tank communicating therewith adjacent its lower end, water in said tanks, a source of steam under pressure, conduits from said source communicating with the upper end of each of said auxiliary tanks, the steam adapted to force water from said tanks into said first mentioned tank, conduits from said source communicating with a plurality of nozzles in said tank, the steam adapted to circulate and heat the water therein, said nozzles arranged in groups and positioned parallel to opposite side walls of said tanks and control means associated with said material discharge pipe for shutting off the supply of steam whenever the flow of material ceases through said discharge pipe, said control means including a flap valve in said discharge pipe and an automatic switch for closing a valve in the steam supply line.

7. In apparatus of the class described, the combination with a tank having continuously moving liquid heating means therein of a conduit for circulating material to be heated in an opposite direction, said conduit adapted to be submerged in said liquid heating means, automatic means controlling the supply of heating medium in accordance with the temperature of the heating medium, said automatic means including a pair of auxiliary tanks located on the sides of said first named tank and having passageways leading thereto adjacent the bottom of the tank, a steam supply to the upper end of said auxiliary tanks for forcing the liquid in said tanks into said first named tank and relief valves for said steam so arranged that when the steam supply is cut off the volume of liquid heating means is reduced in said first named tank to uncover a portion of the material conduit.

8. In apparatus of the class described, the combination of an elongated horizontally disposed main tank having water therein, a plurality of horizontally disposed parallel pipe members in said tank fastened in opposite ends of said tank, covers on the ends of said tanks having passageways therein forming a continuous circuitous conduit between said pipe members, a supply pipe connected through one of said covers to the lowermost of said pipes, said supply pipe having a portion positioned below said tank before entering one of said covers, a preheating chamber surrounding the above mentioned portion of said supply pipe, a conduit for heating fluid connected from the lower side of said tank to said preheater chamber, a discharge pipe connected through one of said covers to the uppermost of said pipes, a pair of auxiliary tanks upon opposite sides of said tank communicating therewith adjacent its lower end, water in said tanks, a source of steam under pressure, conduits from said source communicating with the upper end of each of said auxiliary tanks for forcing the water therein into said main tank to raise the level of the same and conduits from said source communicating with a plurality of nozzles in said tank, said nozzles arranged in groups and positioned parallel to opposite side walls of said tank to circulate the water therein in one direction.

9. In apparatus of the class described, the combination of a horizontally disposed main tank, water therein, a plurality of parallel pipe members therein fastened in opposite ends of said tank, the level of the water in said tank being below some of said pipe members, covers on the ends of said tank having passageways therein forming a continuous circuitous conduit between said pipe members, a supply pipe connected to the lowermost of said pipes, a discharge pipe connected to the uppermost of said pipes, a pair of auxiliary tanks upon opposite sides of said tank communicating therewith adjacent its lower end, water in said auxiliary tanks, a source of steam under pressure, conduits from said source communicating with the upper end of each of said auxiliary tanks for forcing the water therein into said main tank to raise the level of the water therein above all of said pipe members and conduits from said source communicating with said main tank for heating the water therein.

10. In apparatus of the class described, the combination of an elongated horizontally disposed main tank, water therein, a plurality of parallel pipe members therein fastened in opposite ends of said tank, the level of the water in said tank being below some of said pipe members, covers on the ends of said tank having passageways therein forming a continuous circuitous conduit between said pipe members, a supply pipe connected through one of said covers to the lowermost of said pipes, a discharge pipe connected through one of said covers to the uppermost of said pipes, a pair of auxiliary tanks upon opposite sides of said tank communicating therewith adjacent its lower end, water in said auxiliary tanks, a source of steam under pressure, conduits from said source communicating with the upper end of each of said auxiliary tanks for forcing the water therein into said main tank to raise the level of the water therein above all of said pipe members and conduits from said source communicating with a plurality of nozzles in said tank, said nozzles arranged in groups and positioned parallel to opposite side walls of said tank and located so that they are normally submerged during operation and heat and circulate the water in said main tank.

11. In apparatus of the class described, the combination of an elongated horizontally disposed tank having water therein, a medial vertical dividing wall in said tank extending almost to the ends of the same, a plurality of parallel pipe members in said tank disposed on both sides of said medial wall and fastened in opposite ends of said tank, covers on the ends of said tanks having passageways therein forming a continuous circuitous conduit between said pipe members, a material supply pipe connected through one of said covers to the lowermost of said pipes, a material discharge pipe connected through one of said doors to the uppermost of said pipes, a pair of auxiliary tanks upon opposite sides of said tank communicating therewith adjacent its lower end, water in said tanks, a source of steam under pressure, conduits from said source communicating with the upper end of each of said auxiliary tanks, the steam adapted to force water from said tank into said first mentioned tank, conduits from said source communicating with a plurality of nozzles in said tank, the steam adapted to circulate and heat the water therein, said nozzles arranged in groups and positioned parallel to opposite side walls of said tanks and temperature control means in said material discharge pipe for controlling the supply of steam.

12. In apparatus of the class described, the combination of a horizontally disposed main tank, a vertical medial dividing wall therein extending almost to the ends of said tank, water in said tank, a plurality of parallel pipe members therein disposed upon opposite sides of said medial wall and connected at their ends to form a continuous circuitous conduit, a pair of auxiliary tanks upon opposite sides of said main tank communicating therewith adjacent its lower end, water in said auxiliary tanks, a source of steam under pressure, conduits from said source communicating with the upper ends of each of said auxiliary tanks adapted to force the water therein into said main tank to raise the level of the same, and conduits from said steam source communicating with said main tank for heating the water therein.

13. In apparatus of the class described, the combination of a horizontally disposed main tank, a vertical medial dividing wall therein extending almost to the ends of said tank, water in said tank, a plurality of parallel pipe members therein disposed upon opposite sides of said medial wall and connected at their ends to form a continuous circuitous conduit, a pair of auxiliary tanks upon opposite sides of said main tank communicating therewith adjacent its lower end, water in said auxiliary tanks, a source of steam under pressure, conduits from said source communicating with the upper ends of each of said auxiliary tanks adapted to force the water therein into said main tank to raise the level of the same, conduits from said steam source, nozzles in the side walls of said main tank connected to said conduit, said nozzles positioned at opposite ends of said main tank and pointed in opposite directions and adapted to direct steam to circulate and to heat the water in said main tank.

14. In apparatus of the class described, the combination of a horizontally disposed tank having water therein, a dividing wall in said tank extending almost to the ends of the same, a plurality of steam nozzles positioned in said tank on opposite sides thereof and pointed in opposite directions and adapted to heat said water and continuously circulating the same in one direction about said dividing wall, and a plurality of horizontally disposed material conduits disposed in said tank about said dividing wall and adapted to be submerged in said heated and circulating water and so arranged that the flow of material therethrough is in a direction opposite to the flow of the heated water.

15. In apparatus of the class described, the combination of a horizontally disposed rectangular tank having a liquid medium therein, a vertical medial dividing wall in said tank extending almost to the ends of the same, means including a plurality of steam jets submerged in and associated with said liquid for heating and continuously circulating the same in one direction about said medial dividing wall and a plurality of material conduits disposed in said tank and submerged in said liquid and arranged about said medial wall so that the flow of material therethrough is in a direction opposite to the flow of the liquid heating means.

ROBERT H. CARSON.